UNITED STATES PATENT OFFICE.

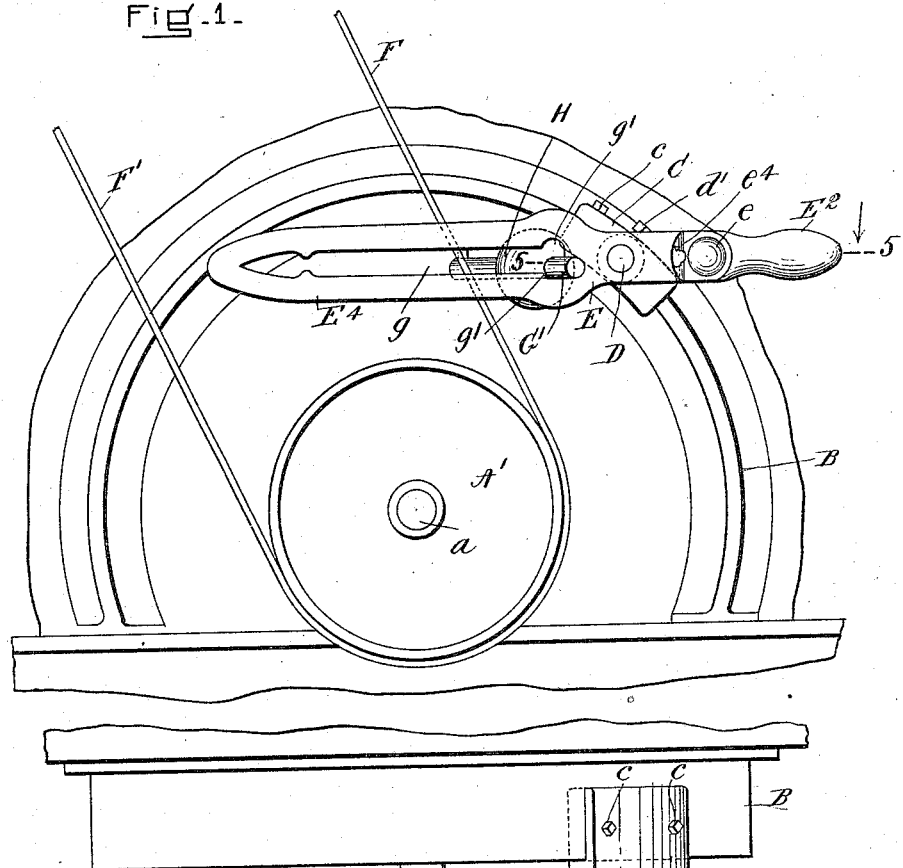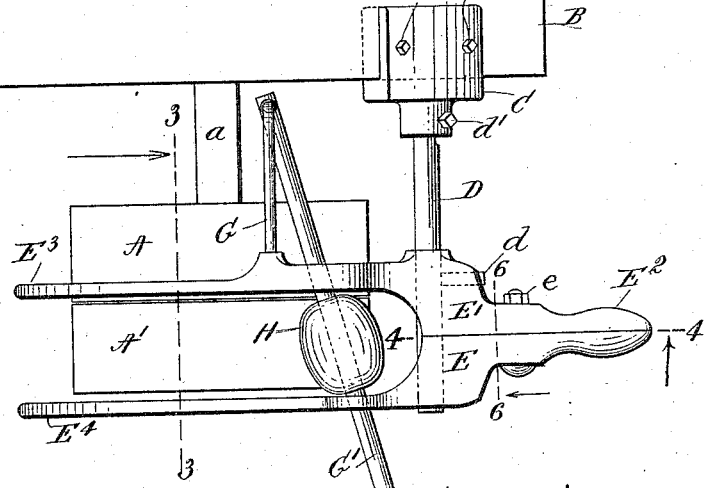

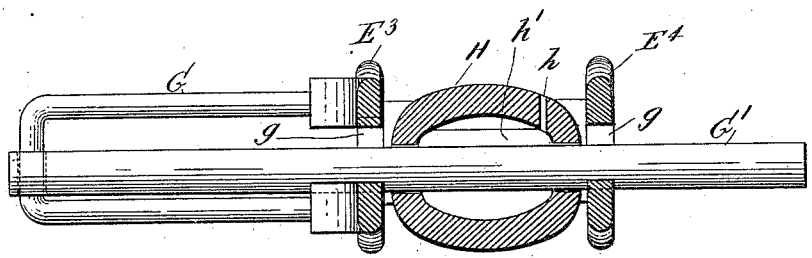
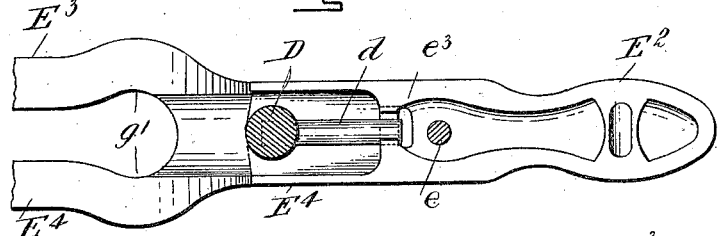
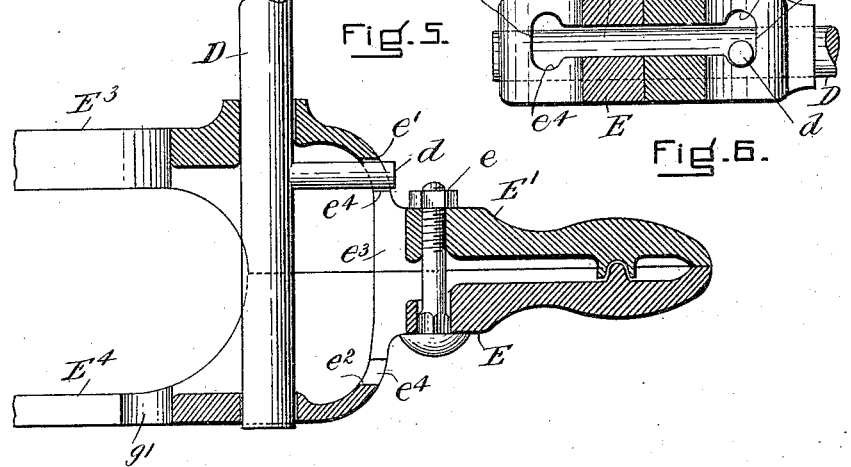

LOREN W. PENNEY, OF NEWTON, MASSACHUSETTS, ASSIGNOR TO SACO-LOWELL SHOPS, OF BOSTON, MASSACHUSETTS, A CORPORATION OF MASSACHUSETTS.

BELT-SHIPPER.

1,182,203.   Specification of Letters Patent.   Patented May 9, 1916.

Application filed June 10, 1914. Serial No. 844,320.

*To all whom it may concern:*

Be it known that I, LOREN W. PENNEY, of Newton, in the county of Middlesex and State of Massachusetts, a citizen of the United States, have invented a new and useful Improvement in Belt-Shippers, of which the following is a specification.

My invention is especially designed for use in shipping belts from the loose to the fast pulley on carding engines, where the weight of the cylinder is considerable.

In order to prevent the belt from slipping on the fast pulley after it has been shipped it has usually been the custom for the operator to bind the belt more or less against the fast pulley by hand in order to increase temporarily the amount of frictional contact between the belt and the pulley. When the inertia of the cylinder is once overcome the operator releases the belt and the normal relations of the belt to the pulley are resumed. The use of the hands for this purpose is unsafe, and my invention relates especially to other means for accomplishing this purpose.

My invention will be understood by reference to the drawings, in which it is illustrated in its preferred form.

Figure 1 is an end elevation of a portion of the carding engine, showing the pulley and the attachment of my belt shipper to the frame of the machine. Fig. 2 is a top view. Fig. 3 is an enlarged sectional end elevation of my invention taken on line 3—3 of Fig. 2. Fig. 4 is a side view taken on line 4—4 of Fig. 2. Fig. 5 is a section taken on line 5—5 of Fig. 1. Fig. 6 is a section taken on the line 6—6 of Fig. 2.

A, $A^1$ are the fast and loose pulleys, respectively, mounted on the main shaft $a$ on which the cylinder is mounted.

B is the usual strengthening rib or flange-forming part of the frame of the machine. My improved belt shipper is preferably mounted on this flange B by means of a clamp C which is clamped thereto by bolts or screws $c$. In a suitable opening in this clamp is mounted a rod D carrying a stop pin $d$ which projects at right angles therefrom. This rod D is adjustable in the clamp C about its longitudinal axis, being fastened by the set screw $d^1$. On this rod D slides the shipper proper which as shown comprises two parts E, $E^1$ similar in general character and bolted together by a bolt $e$, these parts being constructed to form a handle $E^2$. The part $E^1$ carries an arm $E^3$ and the part E carries an arm $E^4$, these arms together forming the fork within which the belt F, $F^1$ runs. A slot $e^3$ is provided in the frame in which the pin $d$ runs. The pin $d$ serves to limit the inner and outer traverse of the shipper. For this purpose the shipper is provided with a narrow slot $e^3$ in which the pin $d$ lies. The ends of this slot $e^1$ and $e^2$, respectively, engage the pin $d$ as the shipper is moved to carry the belt from the fast pulley A to the loose pulley $A^1$, or from the loose pulley to the fast pulley, as the case may be. The shipper is maintained in horizontal position by contact of this pin $d$ with the lower wall of the slot $e^3$. The slot $e^3$ has recesses $e^4$ at each of its ends in which the pin $d$ lies to lock the shipper when it is not in use (see Figs. 5 and 6). These recesses are formed both in the part E and in the part $E^1$ as the device is reversible as referred to below.

In order to give to the belt F the additional amount of frictional contact with the pulley necessary to start up the machine promptly without rendering the operator liable to injury, I have mounted on the part $E^1$ of the shipper a yoke frame G which carries an arm $G^1$ capable of a swinging movement in a horizontal plane. This arm $G^1$ passes outward through slots $g$ in the shipper and its outer end serves as a handle by which it may be moved. The slots $g$ are of sufficient length to allow the arm $G^1$ to have considerable swing.

On the arm $G^1$ is mounted an idler or friction roll H of convenient shape to engage the belt F in the manner desired. As shown it is shaped somewhat like an egg and is hollow to form a lubricating chamber $h^1$, a passage $h$ being provided by which a lubricant may be applied to it. The idler is free to rotate on the arm $G^1$ and is also free to be moved lengthwise of the rod as occasion may require during the belt-manipulating operation by engagement with the fork arms $E^3$, $E^4$. For this purpose it is preferably rounded off at the ends so that there may be no undue friction between it and the inner walls of the fork arms $E^3$, $E^4$. The slot in the arm $E^4$ is enlarged at one end (see $g^1$) in order to form a recess in which the arm $G^1$ may normally lie.

In practice, if it is desired to ship the belt say from the loose pulley $A^1$ to the fast pulley $A$, the shipper as a whole is first tilted slightly to lift the pin $d$ out of its recess $e^4$ and is then pushed inward toward the cylinder. This of course carries with it the supporting yoke $G$ and arm $G^1$ which are part of the shipper. The length of travel of the shipper upon the rod $D^1$ is determined by the engagement of the pin $d$ with the surface $e^2$. When the shipper is released the pin falls into the recess at the outer end of the lower wall of the slot $e^3$. At that moment the superficial contact between the belt $F$ and the pulley $A$ will probably not be sufficient to start up the heavy cylinder and the belt will slip more or less, and ordinarily the operator would press the two opposing portions of the belt together with his hands, so that the belt would hug the pulley $A$ more closely. In the use of my invention, however, instead, he would lift the arm $G^1$ out of the recess $g^1$ in which it was lying and then pull it over so that the idler $H$ would engage the belt with as much pressure as is necessary and bring it into engagement with a greater portion of the surface of the pulley $A$.

One advantage of this structure is that it is reversible. For example, as shown in the drawings it is set up to act upon a belt coming in from the left, but if the belt came in from the right it would simply require that the clamp $C$ be applied to another part of the flange $B$ in which case the shipper will be reversed, what was its lower portion becoming its upper portion and its fork pointing to the right (see Fig. 1) instead of to the left. Moreover, it may be used with many other kinds of machines besides the carding engine.

Modifications of the structure shown may be made which will embody my invention. While I prefer that the fork which embraces the belt shall be made in two pieces for purposes of simple construction, and the stop be attached to the slide rod to engage a slot in the shipper, the same result may be otherwise secured. The locking of a reversible shipper I believe to be new with me.

What I claim as my invention is:—

1. In a device of the kind described, in combination with a belt and fast and loose pulleys, a forked piece and means for supporting it in relation to said pulleys said forked piece being movable thereon in a right line a limited distance to shift the belt from one pulley to the other, and means located on said support adapted to limit the movement of said forked piece whereby said forked piece will be locked against accidental movement.

2. In a device of the kind described, in combination with a belt and fast and loose pulleys, a forked piece, means for supporting it in relation to said pulleys whereby it may be moved in a right line a limited distance to shift the belt from one pulley to the other, means for locking it at each limit of its movement against accidental displacement, one member of said locking means being carried by said forked piece and means for adjusting it about a horizontal axis.

3. In a device of the kind described, in combination with a belt and fast and loose pulleys, a forked piece, a support, said forked piece being adapted to slide on said support to shift the belt from one pulley to the other, and means adapted to coöperate with said forked piece whereby it may be held in substantially horizontal position and the extent of its sliding operation may be limited and locked, said means comprising a pin projecting from said support and members on said forked piece adapted to engage said pin.

4. In a device of the kind described, in combination with a belt and fast and loose pulleys, a forked piece, a support, said forked piece being adapted to slide on said support to shift the belt from one pulley to the other, and means comprising a pin projecting from said support adapted to engage members on said forked piece whereby it may be held in substantially horizontal position and the extent of its sliding operation may be limited and locked.

5. In a device of the kind described, in combination with a belt and fast and loose pulleys, a support, a forked piece adapted to slide on said support to shift the belt from one pulley to the other, a pin projecting from said support adapted to engage members located on said forked piece at each limit of the movement thereof whereby said forked piece by reason of its weight will be locked against additional movement.

6. In a device of the kind described, in combination with a belt and fast and loose pulleys, a forked piece adapted to embrace said belt, a swingable arm mounted on a substantially vertical axis carried by said forked piece and said arm extending across the arms of said forked piece and being adapted to engage said belt between the arms of said forked piece.

7. In a device of the kind described, a forked piece adapted to embrace a belt, a swingable arm mounted on a substantially vertical axis carried by said forked piece and adapted to cross the arms of said forked piece and engage the belt between the arms of said forked piece, said swingable arm carrying an idler adapted to engage said belt.

8. In a device of the kind described, a forked piece adapted to embrace a belt, a swingable arm mounted on a substantially vertical axis carried by said forked piece and adapted to cross the arms of said forked piece and engage the belt between the arms of said forked piece, and means located to hold said swingable arm out of contact with said belt.

LOREN W. PENNEY.

Witnesses:
GEORGE O. G. COALE,
M. E. FLAHERTY.

Copies of this patent may be obtained for five cents each, by addressing the "Commissioner of Patents, Washington, D. C."